United States Patent [19]

Pocklington

[11] 4,229,401
[45] Oct. 21, 1980

[54] METHOD OF MAKING GOLF BALLS
[75] Inventor: Terence W. Pocklington, Tupelo, Miss.
[73] Assignee: Colgate-Palmolive Company, New York, N.Y.
[21] Appl. No.: 43,014
[22] Filed: May 29, 1979

Related U.S. Application Data

[62] Division of Ser. No. 919,381, Jun. 26, 1978, Pat. No. 4,173,345.
[51] Int. Cl.² ............................................. B29C 27/18
[52] U.S. Cl. .................................... 264/248; 156/228; 156/245; 425/812
[58] Field of Search ............... 264/248, 274; 425/812; 156/245, 170, 228, 146

[56] References Cited
U.S. PATENT DOCUMENTS

| | | | |
|---|---|---|---|
| 727,542 | 5/1903 | Kempshall | 264/248 |
| 1,231,530 | 6/1917 | Roberts | 264/248 |
| 1,558,706 | 10/1925 | Mitzel | 273/217 |
| 2,206,971 | 7/1940 | Myers | 264/248 |
| 2,678,468 | 5/1954 | Smith | 425/812 |
| 2,938,237 | 5/1960 | Kern et al. | 425/812 |

FOREIGN PATENT DOCUMENTS

| | | | |
|---|---|---|---|
| 183034 | 3/1963 | Sweden | 425/812 |
| 2816 | of 1904 | United Kingdom | 273/217 |
| 7902 | of 1910 | United Kingdom | 273/220 |
| 968987 | 9/1964 | United Kingdom | 264/248 |

Primary Examiner—James B. Lowe
Attorney, Agent, or Firm—Le Blanc, Nolan, Shur & Nies

[57] ABSTRACT

A method of making golf balls wherein an elastomeric spherical core is formed with a series of narrow shallow surface channels each lying on great circles passing through opposite pole areas, and similar hemispherical cover shells are compression molded upon the core and joined along a transverse seam lying in a plane that intersects all of the great circles, preferably at about 90°.

5 Claims, 4 Drawing Figures

METHOD OF MAKING GOLF BALLS

This is a division of my pending application Ser. No. 919,381 filed June 26, 1978, now U.S. Pat. No. 4,173,345 issued Nov. 6, 1979.

This invention relates to methods of making golf balls and particularly to the manufacture of so-called two-piece golf balls wherein a cover is directly applied to a preformed central core.

Golf balls wherein the central core is directly enveloped by a tough outer cover have been proposed and made. For example in the United States Patent to Gammeter U.S. Pat. No. 1,729,717 issued Oct. 1, 1929 there is disclosed a method and apparatus wherein a rubber core has two similar hemispherical cover shells applied to it in a compression mold, the shells being joined at the equatorial seam. One of the problems attendant to this mode of making golf balls was the unavoidable entrapment of air between the cover and core, a fault which usually exhibited itself in a porous structurally weak seam where the shells were joined leading to cover failure upon impact by a golf club, and a major feature of the invention herein is to correct this fault.

Thus prior to the invention it has not been possible to satisfactorily make two-piece golf balls in compression molding apparatus.

One proposed solution of the problem has been injection molding of the cover about a central rubber core, but this is an expensive process requiring special pins or needles to support and center the core during molding of the cover around it, and the pins must be pulled out at a critical stage in the injection cycle. Besides the cost and complexity of the mold, the core locating pins wear quite rapidly producing cosmetic defects on the ball cover surface, and maintenance in the process is substantial. An example of this injection molding technique is disclosed in U.S. Pat. No. 758,851 to Richards.

The invention makes it possible to satisfactorily produce two-piece golf balls in compression molding apparatus. The invention includes the amazing discovery that, if the spherical surface of the rubber or equivalent elastic core is specially grooved, namely formed or otherwise provided with a series of relatively shallow but defined surface channels all of which follow great circles defined by the intersections of the core surface with planes passing through the opposite poles, similar hemispherical covers of usual golf ball cover material may be affixed to envelop the core without entrapment of air between the core and the cover in the final product, using conventional compression molding equipment such as that for example currently used in making so-called 3-piece golf balls wherein the elastic core is surrounded by windings of elastic and prior to compression molding thereon of the hemispherical cover halves.

It has been heretofore proposed to form rough or corrugated areas on the core surface in a two-piece golf ball, prior to attachment of hemispherical cover halves, as disclosed in U.S. Pat. No. 1,558,706 to Mitzel issued Oct. 27, 1975, but these corrugations are not on great circles and their purpose is essentially to prevent relative movement between the cover and core when the ball is impacted and they will not provide the advantage of the invention.

PREFERRED EMBODIMENTS

Figure 1:
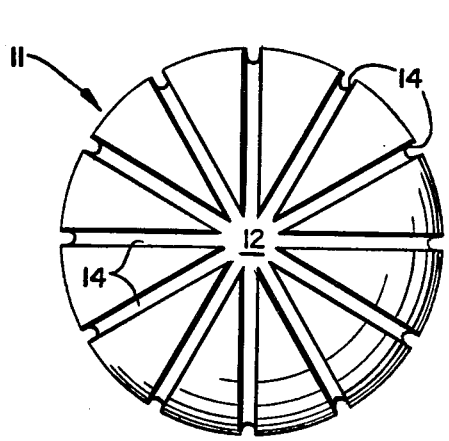
FIG. 1 is a top plan view of a spherical golf ball core having surface channels according to a preferred form of the invention.

FIG. 1 shows a preformed golf ball core 11 in the shape of a solid sphere of elastic material. This sphere has polar areas indicated at 12 and 13, and the surface of the sphere is formed with a multiplicity of channels 14 all of which lie on great circles of the sphere and pass through both polar areas.

In practice for a core of conventional diameter, twelve surface channels 14 are formed each having a width w of 1/16" and a depth d of 1/16". The ratio of w/d is preferably 1:1. The channels are preferably equiangularly spaced around the sphere. These channels are preferably formed during molding of the core.

Figure 2:
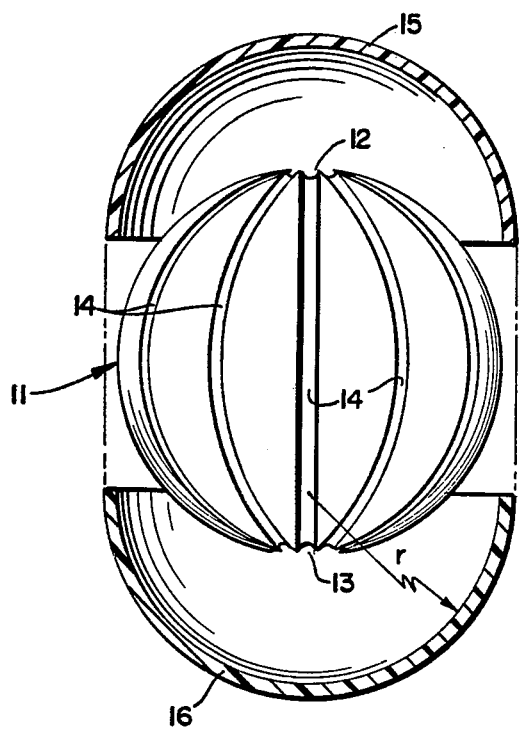
FIG. 2 is a side elevation of the core of FIG. 1, diagrammatically showing the hemispherical cover halves to be attached to the core by compression molding.

The preformed core having the surface channels 14 is placed in a conventional compression molding apparatus, preferably in the attitude shown in FIG. 2 wherein the respective poles lie substantially in a vertical plane. The usual preformed hemispheres of cover material shown at 15 and 16 in FIG. 2 are then brought together from above and below to enclose the core. Preferably each hemisphere has a smooth inner spherical contour surface on a radius r and the diameter of the spherical core surface is about equal to 2r so that as the hemispheres are brought together they may totally tightly enclose the elastic core.

It has been observed that when the hemispheres 15 and 16 are heat softened and brought together by movement of heated backing dies (not shown) is the direction of the arrows in FIG. 2 the inner surface of each hemisphere deformably enters and fills the channels 14 and during compression as the plastic softens and fills the channels air trapped between the core and hemispheres appears to flow down the channels away from the poles to be discharged away from the ball at the equatorial region and the circular edge areas of the hemispheres are integrally welded in an air tight seam 19 around the equatorial region.

Figure 4:
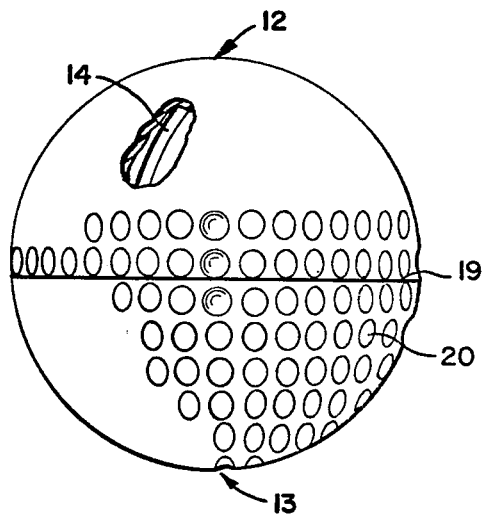
FIG. 4 shows the completed golf ball.
Figure 3:
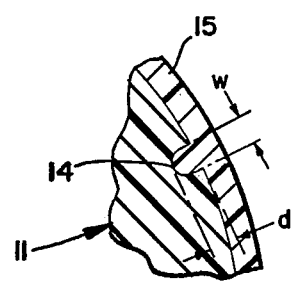
FIG. 3 is an enlarged fragmentary view in section showing the relationship of a core surface channel and the cover after compression molding.

As shown in FIG. 4 the equatorial seam 19 between the cover halves is continuous and extends generally transversely lying in a plane that intersects all of the great circles of channels 14, the plane of each great circle intersecting the plane of the seam at an angle between 45° and 135° but preferably at about 90°.

The dies themselves are conventionally formed to at the same time impart the outer spherical surface and the external cover dimples 20 as shown in FIG. 4 on the completed ball.

The core is a homogeneous body approximately 1.5 inches in diameter and may be made of any suitable elastomeric material conventionally used for golf ball cores. It is advantageously composed of a mixture of synthetic rubber, a cross-linkable acrylic monomer, inorganic fillers and cross linking agents. While it is essentially solid it may be capable of slight radial compression.

The cover material may be any suitable durable thermoplastic or thermoformable material conventionally used for golf ball covers. However the preferred material is an ionomer resin consisting of a copolymer of an olefin and at least are unsaturated monocarboxylic acid copolymerizable therewith. This material, one commercial form of which is marketed under the trademark SURYLN, is disclosed in U.S. Letters Patent to Harrison and Broughten U.S. Pat. No. 3,454,280 wherein the preferred composition is described as a copolymer of ethylene and at least one unsaturated monocarboxylic acid containing from three to eight carbon atoms, said copolymer containing up to thirty percent by weight of the acid. This patent is incorporated by reference for further disclosure of the preferred cover material.

It has been found advantageous to so relate the die pressures and the core and hemisphere dimensions that in the final ball product the core is under slight radial compression and the cover is under slight circumferential tension.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of making a golf ball comprising the steps of providing a preformed homogeneous spherical core of elastomeric material having a multiplicity of relatively shallow surface channels all lying on the paths of great circles passing through opposite poles on said core surface and compression molding preformed hemispherical cover shells of thermoplastic or thermoformable material upon and about said core under heat and pressure, said shells being substantially centered with said poles as they are brought together to integrally weld around a generally transverse equatorial seam.

2. The method of claim 1 wherein said seam lies in a plane that intersects the planes of said great circles at an angle between 45° and 135°.

3. The method defined in claim 2 wherein the plane of the seam intersects each great circle plane at about 90°.

4. The method defined in claim 1 wherein the cover material deforms under heat and pressure to fill said channels progressively from the poles toward the equatorial region where the shells are joined.

5. The method defined in claim 1 wherein during the compression molding operation said shells move together in a direction parallel to a vertical plane through said poles.

* * * * *